United States Patent [19]
Sasaki et al.

[11] Patent Number: 6,059,684
[45] Date of Patent: May 9, 2000

[54] DRIVE TRAIN FOR ELECTRIC CARS

[75] Inventors: Yoshihiko Sasaki; Yoshio Kintou; Masahiro Hasebe, all of Anjo, Japan

[73] Assignee: Aisin AW Co., Ltd., Japan

[21] Appl. No.: 09/061,181

[22] Filed: Apr. 17, 1998

[30] Foreign Application Priority Data

Apr. 17, 1997 [JP] Japan .................................. 9-114201

[51] Int. Cl.[7] .................................................. F16H 57/02
[52] U.S. Cl. ........................ 475/206; 475/149; 475/207; 180/65.6
[58] Field of Search ................... 180/65.6, 65.1, 180/65.7; 475/149, 206, 207

[56] References Cited

U.S. PATENT DOCUMENTS 4,418,777  12/1983  Stockton ........................... 180/65.6 X
5,443,130  8/1995  Tanaka et al. ......................... 180/65.6
5,743,348  4/1998  Coppola et al. ....................... 180/65.6

Primary Examiner—Khoi Q. Ta
Attorney, Agent, or Firm—Lorusso & Loud

[57] ABSTRACT

A novel drive train includes a motor, a differential gear unit, and a counter gear mechanism for transmitting the power of the motor to the differential gear unit. A universal joint for joining the differential gear unit to an axle shaft of a vehicle is arranged outward of one axial end of the motor to eliminate interference with the motor, and the differential gear unit is arranged adjacent the opposite axial end of the motor, radially overlapping the motor to the maximum, to thereby shorten the axial distance between the motor and the differential gear unit.

16 Claims, 5 Drawing Sheets

DRIVE TRAIN FOR ELECTRIC CARS

BACKGROUND OF THE INVENTION

1. Field of the Invention

The present invention relates to a drive train for an electric car and, more particularly to a drive train for an electric car in which a motor is combined with a transaxle for transmitting the power of the motor to the vehicle drive wheels.

2. Related Art

One drive train used in electric cars is a triple shaft type drive system in which a motor shaft is arranged on a first axis, a counter gear shaft on a second axis and the output shaft (hereinafter referred to as a "drive shaft") of a differential gear unit on a third axis, so that the motor and the transaxle may be combined to transmit the power of the motor to the differential gear unit through a counter gear mechanism acting as a reduction gear unit, to thereby drive the wheel axle shafts joined thereto. The drive train of this type, in which the motor is combined with a transaxle, requires universal joints having a relatively large radial dimension arranged adjacent to the left and right sides of the differential gear unit. Such a drive train requires provision for avoiding interference between the motor and the large universal joints, which makes it difficult to shorten the distance between the axes of the motor shaft and the drive shaft. As a result, the drive train is longer than a drive train in which the motor and the differential gear unit are horizontally juxtaposed.

In an electric car, as in a car with an internal combustion engine, it is important to retain a sufficient shock absorbing space in the front end of the vehicle, in which the drive system is mounted, that is, in the engine (or motor) compartment, and, accordingly, a need exists to make the length of the drive train as short as possible. U.S. Pat. No. 5,295,413 exemplifies structure designed to meet the demand for a shortened drive train. The disclosed structure has the motor and the differential gear unit arranged vertically on opposite sides of the counter gear mechanism.

However, in the case of the prior art described above, it is necessary not only to avoid the interference between the motor and the universal joint but also to provide space for the structure accommodating the vertical motion of the axle shaft, so that the distance between the axes of the motor shaft and the drive shaft must be longer than that of a horizontal arrangement, thereby requiring enlargement of the vertical dimension of the drive system. Thus, a drive train having the motor and the differential gear unit vertically arranged makes it difficult to retain the minimum ground clearance if the level of the motor compartment of the vehicle is lowered to provide the needed increase in the vertical dimension.

SUMMARY OF THE INVENTION

Therefore, a first object of the present invention is to provide a drive train for an electric car, in which a motor and a transaxle are combined in such a way as to make the radial contour of the overall drive system as compact as possible, while avoiding interference between the motor and the universal joints.

A second object of the invention is to reduce the moment on the counter shaft of the counter gear mechanism and the load on its bearings, to thereby reduce the gear noise while reducing the size of the counter gear mechanism.

A third object of the invention is to minimize the increase in the distance between the universal joints, as might otherwise accompany making the drive train more compact.

A fourth object of the invention is to retain the transverse symmetry of the universal joints with respect to the drive train.

A fifth object of the invention is to shorten the longitudinal dimension of the drive train as mounted on the vehicle.

In order to achieve the first object, the present invention provides a drive train for an electric car, including: a motor; a differential gear unit; and a counter gear mechanism for transmitting the power of the motor to the differential gear unit. The differential gear unit is arranged adjacent one axial end of the motor so as to radially overlap the motor and one universal joint, which joins the differential gear unit to the axle shaft of the vehicle, is arranged at of the other axial end of the motor, opposed to the differential gear unit.

In order to achieve the second object, a counter shaft of the counter gear mechanism is arranged such that an angle, formed by intersection between a line joining said counter shaft and the motor shaft and a line joining the counter shaft and a drive shaft of the differential gear, is substantially a right angle.

In order to achieve the third object, moreover, the counter gear mechanism is arranged on the side of the differential gear unit opposite the motor.

In order to achieve the fourth object, moreover, a driven shaft, joined to a universal joint arranged at the other axial end of the motor, is an extension having a length substantially corresponding to the axial length of the motor.

In order to achieve the fifth object, the motor is arranged vertically above the drive shaft of the differential gear unit.

In the present invention the universal joint, which has previously been an obstacle to the reduction of radial distance between the motor and the differential gear unit in the drive train, is arranged outward of an end of the motor in a radially overlapping arrangement, while the motor and the differential gear unit do not interfere with the universal joint. As a result, the overall radial dimension of the drive train can be minimized to provide a compact structure.

The counter gear mechanism is preferably arranged in such an angular position that the-moments on the counter shaft of the counter gear mechanism, tending to cant ("incline") that shaft, and the loads applied on the bearings supporting the counter shaft are minimized so that the bearing supports for the counter shaft can be made more compact. By reducing the canting of the counter shaft 70, moreover, the gear noise can be reduced.

The motor and the differential gear unit are preferably arranged as close as possible, not only in the radial direction but also axially, to thereby minimize the distance between the universal joints arranged at their opposing ends.

The universal joints joining the differential gear to the axle shafts are preferably arranged symmetrically. As a result, the drive system can be mounted on the center line of the vehicle, and the influence of "torque steering" can be reduced to enhance the steering stability of the vehicle.

The electric motor is preferably mounted vertically above the drive shafts driven off of the differential gear unit, whereby the vertical dimension of the drive train, as mounted on the vehicle, the overall external diameter of the drive train, and especially the longitudinal dimension can be made more compact. As a result, a sufficient shock absorbing space can be retained in front of the drive train, within the motor compartment of the vehicle.

DESCRIPTION OF THE PREFERRED EMBODIMENTS

Various embodiments of the present invention will now be described with reference to the accompanying drawings.

Figure 1:
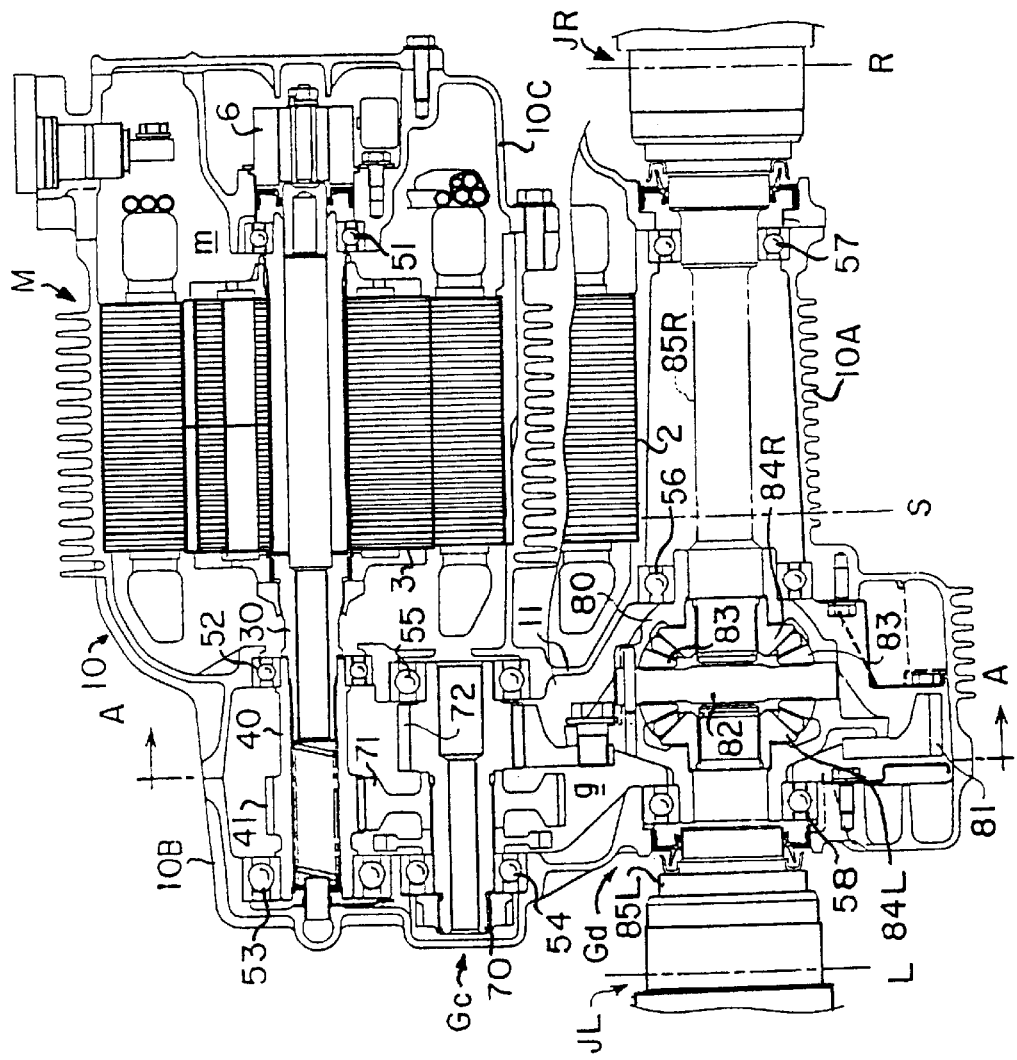
FIG. 1 is an axially exploded section of a drive train for an electric car according to a first embodiment of the invention.
Figure 2:
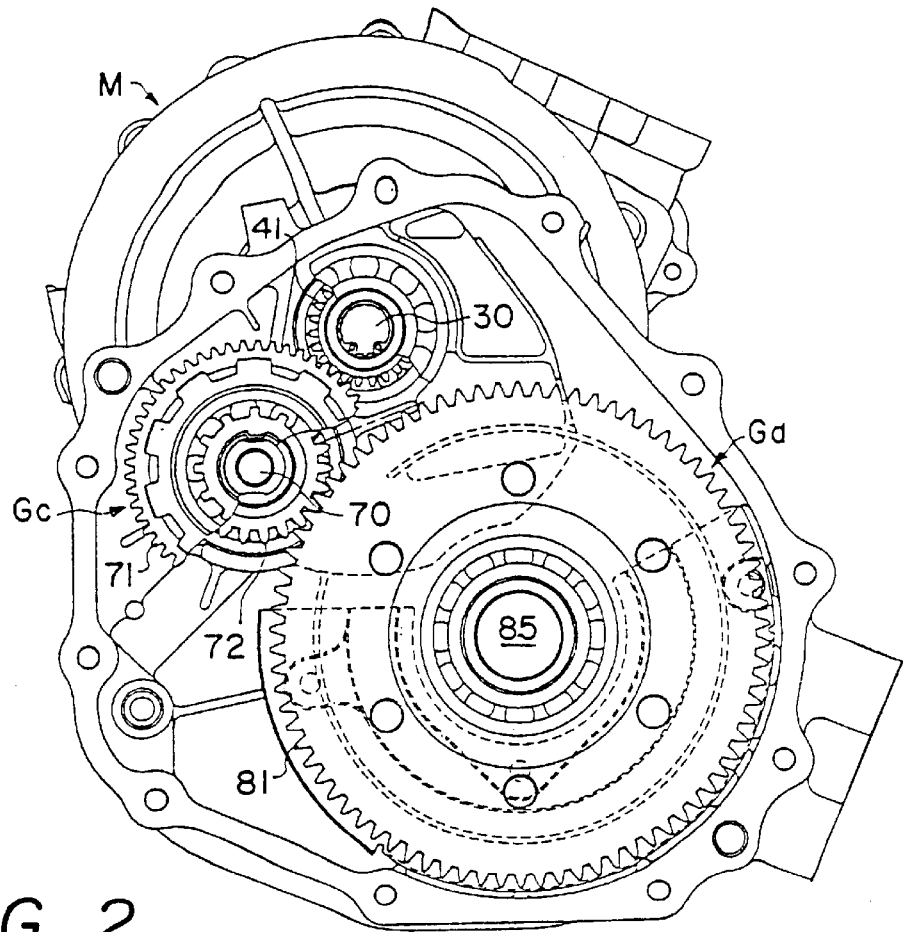
FIG. 2 is a cross-sectional view taken along line A—A in FIG. 1.

FIGS. 1 and 2 show a first embodiment of the invention wherein the drive train includes a motor M, a differential gear unit Gd, and a counter gear mechanism Gc for transmitting the power of the motor M to the differential gear unit Gd. The differential gear unit Gd is arranged adjacent to one axial end of the motor M and radially overlaps the motor M. One universal joint JR joins the differential gear unit Gd to an axle shaft of the vehicle and is arranged at the axial end of the motor M opposite the differential gear unit Gd. The counter gear mechanism Gc is arranged axially outward of the differential gear unit Gd, opposite the motor M.

As shown in the end view of FIG. 2, the motor M is arranged obliquely above drive shaft 85 of the differential gear unit Gd, and a counter shaft 70 of the counter gear mechanism Gc is arranged to the left (in FIG. 2) of a line joining the motor shaft 30 and the drive shaft 85. Moreover, the counter shaft 70 of the counter gear mechanism Gc is arranged such that an angle, formed by intersection between a line joining the centers of the counter shaft 70 and the motor shaft 30 and a line joining the centers of the counter shaft 70 and the drive shaft 85 of the differential gear Gd is substantially a right angle or, more precisely in this embodiment, an acute angle slightly smaller a right angle.

The individual components of the drive train will now be described in more detail. As shown in FIG. 1, a transaxle, defined as including the motor M, the counter gear mechanism Gc and the differential gear unit Gd, is housed in a common case 10, which is composed of a main case 10A, a rear case 10B and a front case 10C. Moreover, the main case 10A has its interior partitioned by a partition 11 and is closed at one end by the front case 10C to form a motor chamber m for housing the motor M and is closed at its other end by the rear case 10B to form a gear chamber g for housing the transaxle.

As shown in FIG. 1, the motor M is exemplified by a permanent magnet type synchronous motor and includes: the motor shaft 30 rotatably supported at its one end through a bearing 51 in the front case 10C and at its other end through a gear shaft 40 and a bearing 52 in the partition 11 of the main case 10A; a rotor 3 having a plurality of permanent magnets arranged to correspond to the number of poles of a number of iron cores fixed to the motor shaft 30; and a stator 2 which is held against rotation by keying its outer periphery to the main case 10A. The stator 2 is formed as a stack (laminate) of iron cores surrounding the outer circumference of the rotor 3 and has slots with coils threaded therein.

Again referring to FIG. 1, a resolver 6 (magnetic pole sensor) is mounted on one end of the motor shaft 30 for detecting the polar position as the motor shaft 30 rotates to allow for motor control by an inverter (not shown).

A gear shaft 40 extends from and is splined to the end of motor shaft 30, and serves as input means for the counter gear mechanism Gc. The gear shaft 40 is supported at its one end in the rear case 10B through the bearing 53 and at its other end in the partition 11 of the case body 10A through the bearing 52, and has an output gear 41 formed integrally therewith adjacent its end remote from the motor M.

The counter gear mechanism Gc, mounted in the gear chamber g, includes: the counter shaft 70 supported at its opposing ends by, respectively, the rear case 10B and the partition 11 of the case body 10A, through bearings 54 and 55; an input gear 71; and a counter output gear 72. The diametrically larger counter input gear 71 is splined to the outer end of the counter shaft 70 and meshes with the output gear 41 of the gear shaft. The counter output gear 72 is diametrically smaller than the input gear 71 and is formed integrally with the inner end side of the counter shaft 70.

The differential gear unit Gd, mounted in the gear chamber g, includes: a differential case 80; a plurality of differential gears 83 and 83 which are bevel gears supported on and fixed to a differential shaft 82 which, in turn, is fixed in the differential case 80 by a pin; a pair of side gears 84L and 84R which are bevel gears meshing with the differential gears B3 and 83; and a ring gear 81 fixed by a bolt on the outer end side of the differential case 80, remote from the motor M and meshing with the counter output gear 72. The case journals, extending from the two ends of the differential case 80, are respectively supported by the rear case 10B and the partition 11 of the main case 10A through left and right bearings 58 and 56. The side gears 84L and 84R in the differential case 80 are splined to left and right drive shafts 85L and 85R and are thereby joined to the left and right axle shafts of the vehicle (not shown) through universal joints JL and JR, respectively. One drive shaft 85R, which extends axially across the stator 2 of the motor M, is supported at its outer end by the main case 10A through a bearing 57. In this embodiment the two drive shafts 85L and 85R are formed as yoke shafts with integral yokes joined to the yokes of the universal joints JL and JR.

When the motor M is started under control of the inverter, rotation of the motor shaft 30 in the counter-clockwise direction, as viewed in FIG. 2, is transmitted from the output gear 41 of the gear shaft 40 to the counter input gear 71 of the counter gear mechanism Gc so that it is reversed, becoming rotation in the clockwise direction, as viewed in FIG. 2. The reversed rotation is transmitted through the counter shaft 70 and the counter output gear 72 to the ring gear 81 of the differential gear unit Gd. The rotations of the side gears 84L and 84R are output from the drive shafts 85L and 85R and transmitted through the universal joints JL and JR and the axle shafts to the wheels with driving forces at differentiated rotational speeds matching the load.

Figure 3:
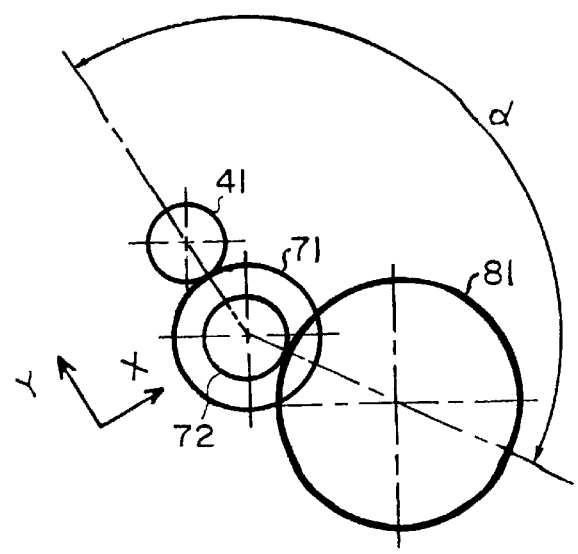
FIG. 3 is a diagram schematically showing the angular relationship between the motor shaft, counter shaft and Gd drive shaft, i.e. the gear meshing angle.
Figure 4:
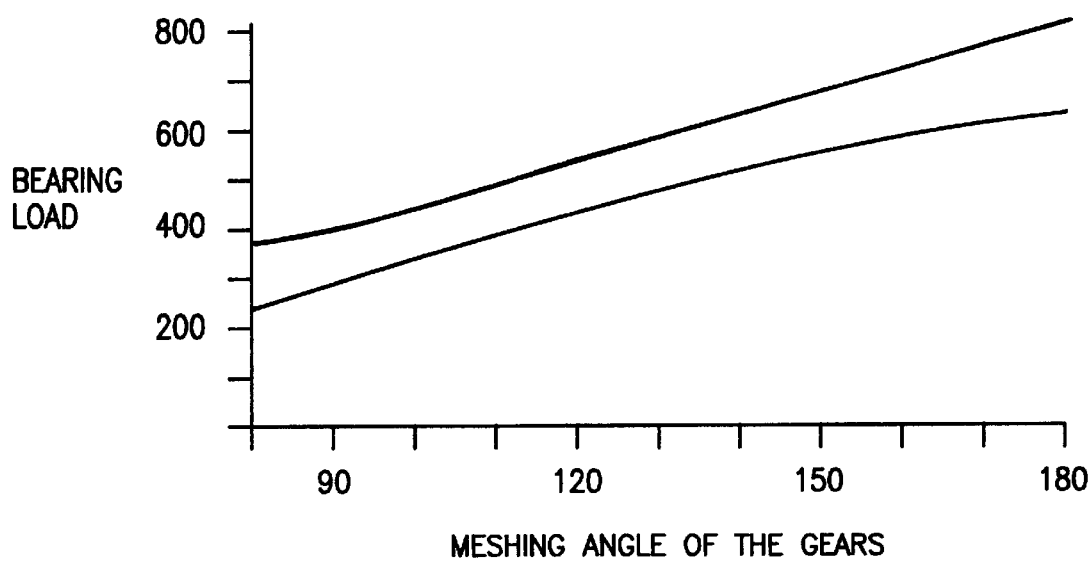
FIG. 4 is a graph illustrating relationships between the gear meshing angle and the bearing load.
Figure 5:
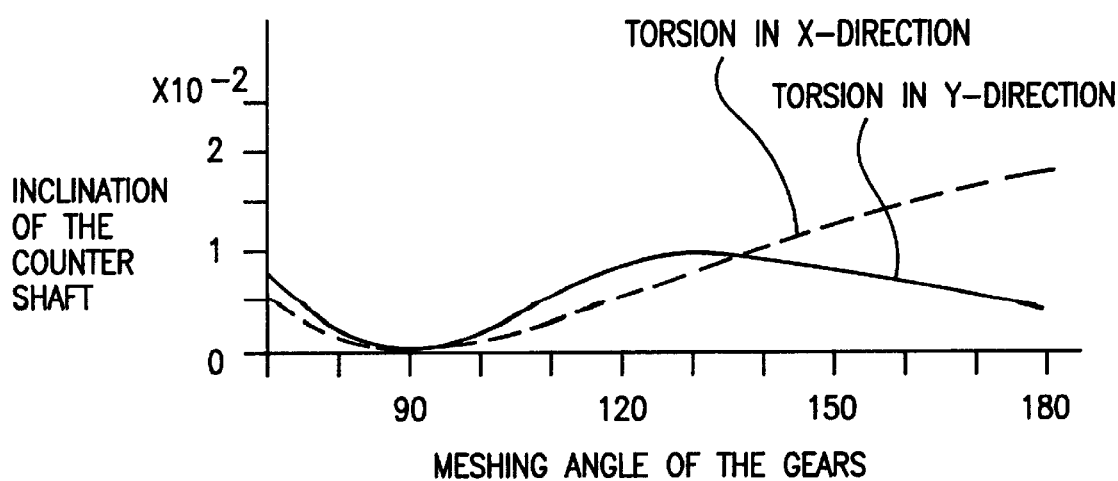
FIG. 5 is a graph illustrating relationships between the gear meshing angle and the canting (inclination) of the counter shaft.

The load applied to the counter shaft 70 in the drive state will now be described with reference to FIG. 3 which schematically shows the positional relationships of the aforementioned individual gears. In FIG. 3, the angle α (hereinafter "meshing angle") is defined between a line passing through the center of ring gear 81 and a line passing through the center of the counter input gear 71 and the counter output gear 72, which lines intersect at an apex on the center of the counter shaft 70 (center of input gear 71 and counter output gear 72). The relationship between this meshing angle α and the loads on the left and right bearings of the counter shaft 70 is illustrated in FIG. 4, and the relationship between meshing angle α and the canting (inclination) of the counter shaft is illustrated in FIG. 5. It is seen from FIG. 4 that both the load (FB2) applied to the lefthand bearing and the load (FB1) applied to the righthand bearing become lower as the meshing angle becomes smaller. It is also seen from FIG. 5 that the inclination of the counter shaft is minimum when the meshing angle is 90 degrees in both the X-direction (as indicated by a solid curve) and the Y-direction (as indicated by a broken curve). Therefore, by arranging the counter shaft 70 at a position where the meshing angle is near 90 degrees, as in this embodiment, it is possible to minimize both the bearing loads and the inclination (canting) of the counter shaft 70.

Figure 6:
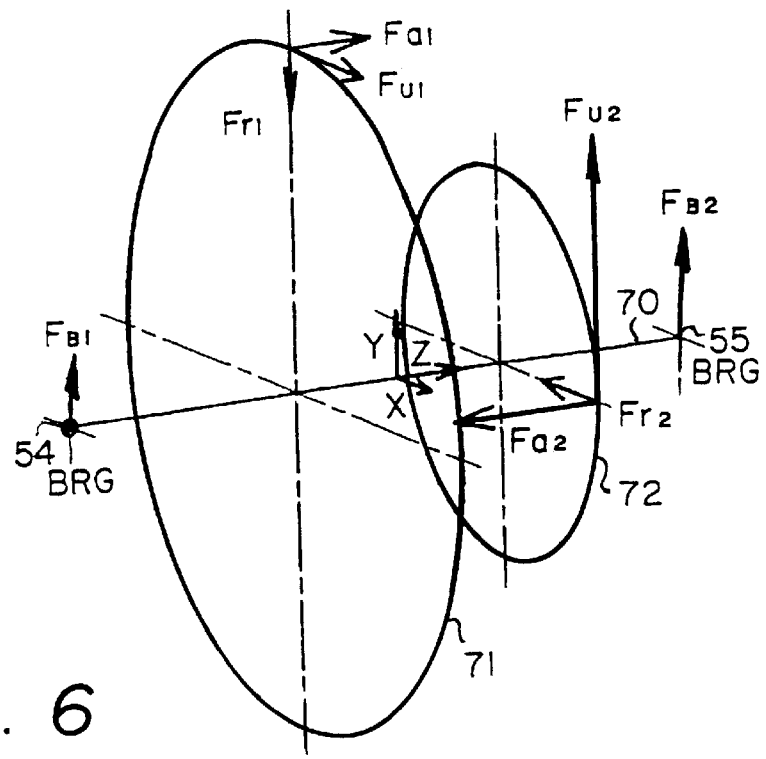
FIG. 6 is a force diagram, i.e. in perspective view, illustrating the relationship of forces on the counter shaft in the first embodiment.
Figure 7:
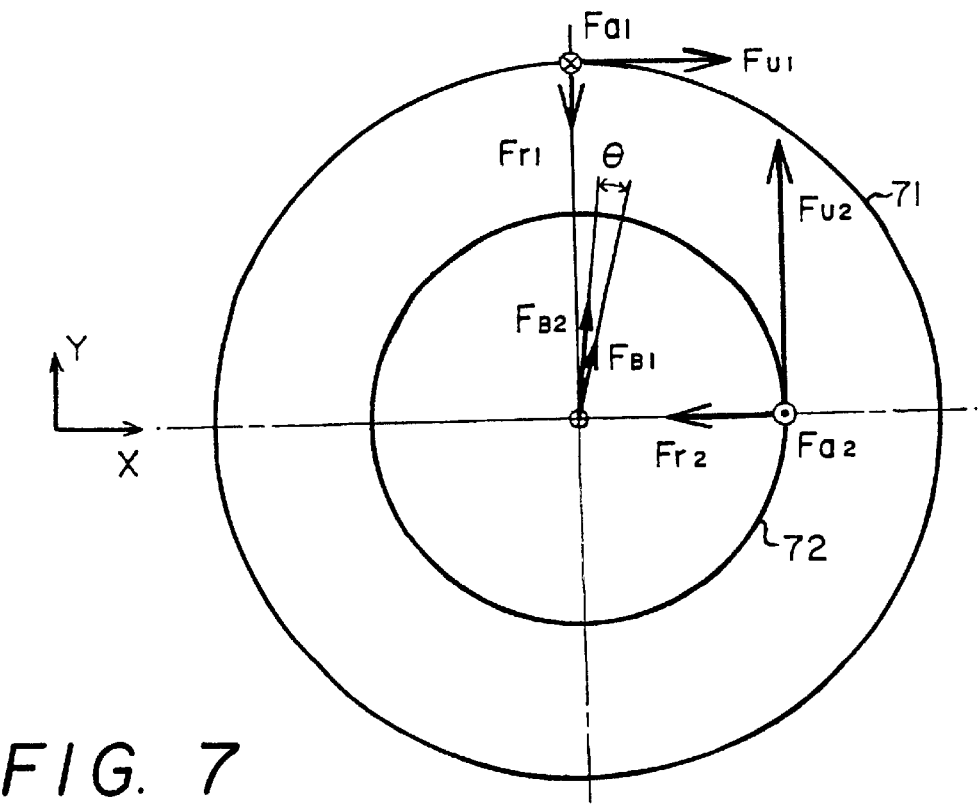
FIG. 7 is a side elevation of the force diagram of FIG. 6, as viewed in the Z-direction.

The foregoing relationships can be explained by analysis of the forces acting on the counter shaft as shown in FIGS. 6 and 7. In FIGS. 6 and 7: symbols Fu1 and Fu2 designate the tangential forces on the pitch circles of the gears; symbols Fr1 and Fr2 designate the radial forces established by the pressure-angles of the gears; symbols Fa1 and Fa2 designate the axial forces received through the gears; and symbols FB1 and FB2 designate the loads borne by, respectively, the left and right bearings. Of the loads applied to the bearings, i.e., the bearings 54 and 55 in this embodiment, the X-direction components of the loads shown in FIG. 6 are reduced because the meshing angle α is approximately 90° and, accordingly, the moments established on the Y-axis by the tangential force Fu1 and the radial force Fr2 are offset by the moments established by the axial force Fa2.

As the meshing angle increases, on the other hand, the X-axis component of the tangential force Fu2 (which is amplified by the ratio of the diameters of the gears 71 and 72 in translation to the force Fu1 so that it is far higher than the remaining loads, as illustrated in FIGS. 6 and 7) rises to increase the loads on the bearings 54 and 55. Here, the Y-axis load changes less than the X-axis load with change of the meshing angle.

As to the inclination of the counter shaft 70, on the other hand, the loads FB1 and FB2 on, respectively, bearings 54 and 55 are directionally equalized (to reduce the angle θ) by proper setting of the meshing angle of the larger and smaller gears 71 and 72. In other words, the torsional inclination of the counter shaft 70 under load, due to the radial clearance of the bearings, is eliminated by the offset engagement of the meshing tooth surfaces of the gears. Thus, taking into account the movement of the counter shaft 70 in the radial clearance, the center position of the bearings 54 and 55 is set so that the meshing engagement of the gears is at an ideal position for minimal gear noise.

In the drive train of this first embodiment, as has been described, the universal joint JR, which has previously been an obstacle to reduction of the radial distance between the motor M and the differential gear unit Gd in the drive train, is arranged outward of one axial end of the motor M in a radially overlapping manner, without the motor M or the differential gear unit Gd interfering with the universal joint JR. As a result, the overall radial dimension of the drive train can be minimized to provide a compact structure. Moreover, the counter gear mechanism Gc is arranged in an angular position where the loads applied to the counter shaft 70 of the counter gear mechanism Gc and its supporting structure are reduced to the minimum so that the supporting structure for the counter shaft 70 can be made more compact. By reducing the inclination of the counter shaft 70, moreover, the gear noise is reduced.

Moreover, the drive shaft 85R, joined to the universal joint JR, is located outward of an axial end of the motor M and has a length substantially equal to the axial length of the stator 2, so that the axial positions L and R of the left and right universal joints JL and JR joining the differential gear unit Gd to the axle shafts are symmetrical with respect to the center line S of the vehicle, as shown in FIG. 1. As a result, the drive train can be mounted in alignment with the vehicle center line, and the influence of "torque steering" can be reduced to enhance the steering stability of the vehicle. Moreover, the counter gear mechanism Gc is arranged at the side of the differential gear unit Gd opposite the motor M and the ring gear 81, having the largest diameter of any of the components of the differential gear unit Gd, is fixed on the outer side of the differential case 80 opposite the motor M. As a result, the motor M and the differential gear unit Gd are arranged as close as possible, not only in the radial direction but also axially, thereby minimizing the distance between the universal joints JL and JR. Moreover, the vertical dimension of the drive train is reduced by reducing the radial contour of the overall drive train, and especially the longitudinal dimension is reduced by positioning the motor M vertically above the drive shaft 85. As a result, sufficient shock absorbing space can be retained in front of the drive train within the motor compartment of the vehicle.

Figure 8:
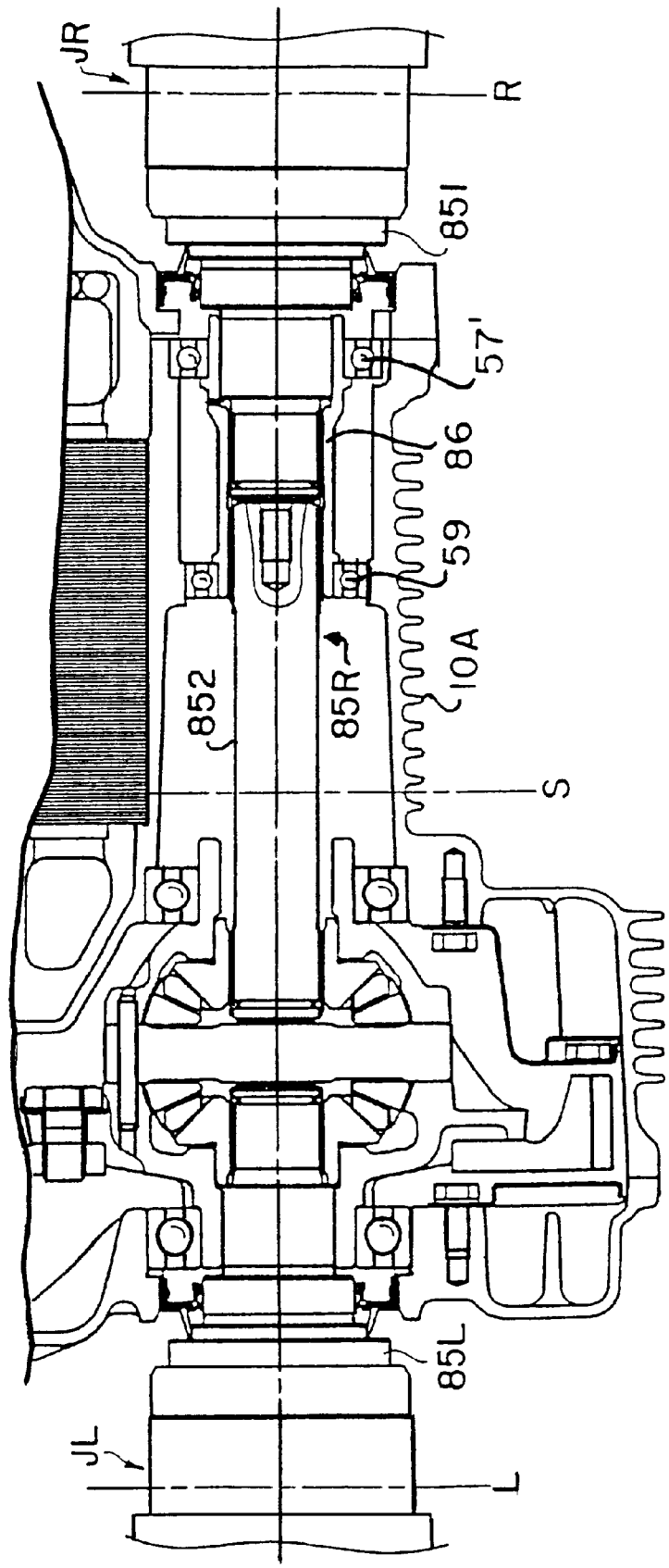
FIG. 8 is a section of an axial portion of a drive system for an electric car according to a second embodiment of the invention.

FIG. 8 shows a second embodiment in which the drive shaft 8, as exemplified by the extension in the foregoing first embodiment, is modified. In this embodiment, the drive shaft BSR, joined to the universal joint JR which is arranged outward of an axial end of the motor M, is separately constructed of a yoke portion 851 and an extension 852. Moreover, the inner end of the yoke portion 851 and the outer end of the extension 852 are splined together in a sleeve joint 96, which is supported at its two ends by the main case section 10A through bearings 57' and 59, so as to transmit power therebetween.

This second embodiment has a more complicated structure, but the supporting structures of the drive shaft 85L (yoke shaft) and the yoke portion 851 of the drive shaft 85R at the opposite side are substantially transversely symmetrical. In contrast to the first embodiment wherein the driven shaft is an extension, the yoke portion 851 can be inserted and removed with the extension 852 being left in place. As a result, the stroke necessary for the insertion and extraction can be shortened to provide an advantage in mounting the drive shaft on the vehicle. Moreover, the lefthand drive shaft 85R and the righthand drive shaft 85L can be made identical to reduce the number of different parts.

The entire disclosure of Japanese Patent Application No. 9-114201, filed on Apr. 17, 1997, including its specification, claims and drawings, is incorporated herein by reference.

While the invention has been described with reference to two preferred embodiments, the foregoing embodiments are merely illustrative of the invention and should not be construed as limiting the invention. Various modifications and applications may be adopted by those skilled in the art without departing from the spirit and scope of the invention as defined by the appended claims.

What is claimed is:

1. A drive train for an electric car, comprising:

a motor with a motor output shaft defining two axially opposite ends of said motor;

a differential gear unit arranged radially overlapping and adjacent to one of said ends of said motor;

first and second drive shafts driven by said differential gear unit;

a counter gear mechanism for transmitting power from the motor to said differential gear unit said counter gear mechanism comprising a counter shaft which is arranged to define a line from its axis to the axis of the motor output shaft which intersects, at substantially a right angle, a line joining the axis of the counter shaft and the axis of said drive shafts; and a universal joint joined to said differential gear unit and arranged axially outward of the other of said ends of said motor, whereby said universal joint and said differential gear unit are located on opposite sides of said motor.

2. A drive train for an electric car according to claim 1, wherein said counter gear mechanism is located at a side of said differential gear unit opposite said motor.

3. A drive train for an electric car according to claim 1, wherein said first drive shaft joins said universal joint to said differential gear unit, extends across the axial length of said motor and has a length substantially equal to the axial length of said motor.

4. A drive train for an electric car according to claim 1, wherein said first drive shaft joins said universal joint to said differential gear unit, extends across the axial length of said motor and has a length substantially equal to the axial length of said motor.

5. A drive train for an electric car according to claim 2, wherein said first drive shaft joins said universal joint to said differential gear unit, extends across the axial length of said motor and has a length substantially equal to the axial length of said motor.

6. A drive train for an electric car according to claim 1 wherein said motor is arranged vertically above said first and second drive shafts, with said motor shaft parallel to said first and second drive shafts.

7. A drive train for an electric car according to claim 1 wherein said motor is arranged vertically above said first and second drive shafts, with said motor shaft parallel to said first and second drive shafts.

8. A drive train for an electric car according to claim 2 wherein said motor is arranged vertically above said first and second drive shafts, with said motor shaft parallel to said first and second drive shafts.

9. A drive train for an electric car according to claim 3 wherein said motor is arranged vertically above said first and second drive shafts, with said motor shaft parallel to said first and second drive shafts.

10. A drive train for an electric car according to claim 4 wherein said motor is arranged vertically above said first and second drive shafts, with said motor shaft parallel to said first and second drive shafts.

11. A drive train for an electric car according to claim 5 wherein said motor is arranged vertically above said first and second drive shafts, with said motor shaft parallel to said first and second drive shafts.

12. A drivetrain for an electric car according to claim 1 wherein said counter gear mechanism comprises a counter shaft defining a counter shaft axis, wherein said motor output shaft defines a motor output shaft axis, wherein said first and second driveshafts are aligned along a driveshaft axis and wherein said motor output shaft axis, said driveshaft axis and said counter shaft axis are spaced from and parallel to each other.

13. A drive train for an electric car, comprising:

a motor with a motor output shaft defining two axially opposite ends of said motor;

a differential gear unit arranged radially overlapping and adjacent to one of said ends of said motor;

first and second drive shafts driven by said differential gear unit;

a counter gear mechanism for transmitting power from the motor to said differential gear unit, said counter gear mechanism comprising a counter shaft and input and output gears mounted on said counter shaft, the input gear of said counter gear mechanism being located outward of the output gear of said counter gear mechanism with respect to the motor as well as being located on a side of said differential gear unit opposite the motor; and a universal joint joined to said differential gear unit and arranged axially outward of the other of said ends of said motor, whereby said universal joint and said differential gear unit are located on opposite sides of said motor.

14. A drive train for an electric car according to claim 13, wherein said first drive shaft joins said universal joint to said differential gear unit, extends across the axial length of said motor and has a length substantially equal to the axial length of said motor.

15. A drive train for an electric car according to claim 13 wherein said motor is arranged vertically above said first and second drive shafts, with said motor shaft parallel to said first and second drive shafts.

16. A drive train for an electric car according to claim 14 wherein said motor is arranged vertically above said first and second drive shafts, with said motor shaft parallel to said first and second drive shafts.

* * * * *